Jan. 7, 1930.

G. PULLETS

WREATH MAKING DEVICE

Re. 17,559

Original Filed Feb. 4, 1926

2 Sheets-Sheet 1

INVENTOR.
George Pullets
BY
Golden H. Blackship
ATTORNEY

G. PULLETS

Jan. 7, 1930. WREATH MAKING DEVICE Re. 17,559

2 Sheets-Sheet 2

Original Filed Feb. 4, 1926

INVENTOR.
George Pullets
BY
Golton & Blackmore
ATTORNEY

Reissued Jan. 7, 1930

Re. 17,559

UNITED STATES PATENT OFFICE

GEORGE PULLETS, OF NEW YORK, N. Y., ASSIGNOR OF ONE-HALF TO FRANK C. BRAUN, OF NEW YORK, N. Y.

WREATH-MAKING DEVICE

Original No. 1,610,468, dated December 14, 1926, Serial No. 86,106, filed February 4, 1926. Application for reissue filed July 7, 1927. Serial No. 204,118.

This invention relates generally to wrapping and filling methods and means, and has particular reference to a method and device for manufacturing wreaths, including forming the body of them by an extruding method in one type of wreath, and covering them by a winding operation, in either of two types of wreaths disclosed herebelow.

The invention has for an object the provision of an improved wreath making machine which will act more efficiently in making wreaths.

Another object of the invention is to provide a new wrapping means for annular or like-shaped objects.

A further object is to provide a combined method and means for manufacturing and covering a wreath having either a hollow preformed body, or one in which the material is solid throughout the cross-section of the wreath and is extruded into the desired shape, either type of wreath being adapted to be manufactured from the one device at will.

For further comprehension of the invention, and of the objects and advantages thereof, reference will be had to the following description and accompanying drawings, and to the appended claims in which the various novel features of the invention are more particularly set forth.

Fig. 1 of the drawings, is a front elevational view of my improved device.

Figure 1:
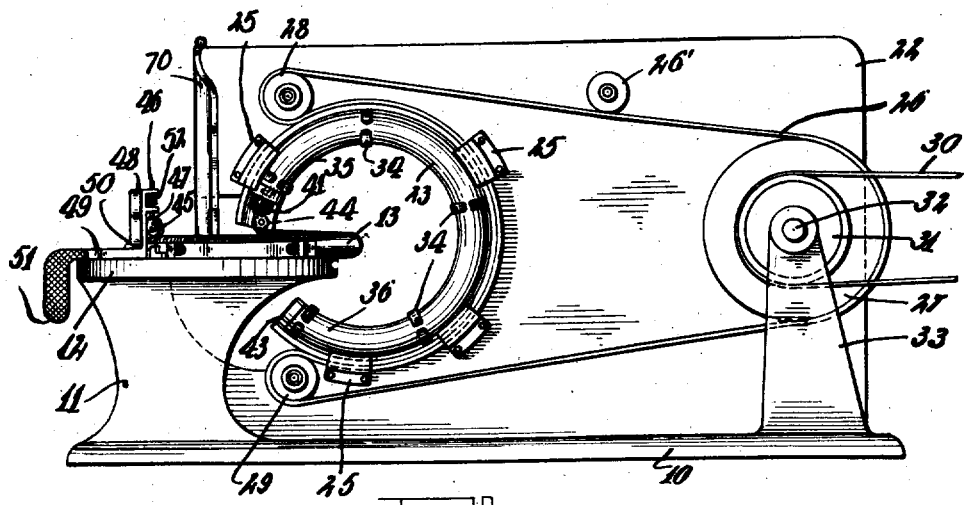
Figure 2:
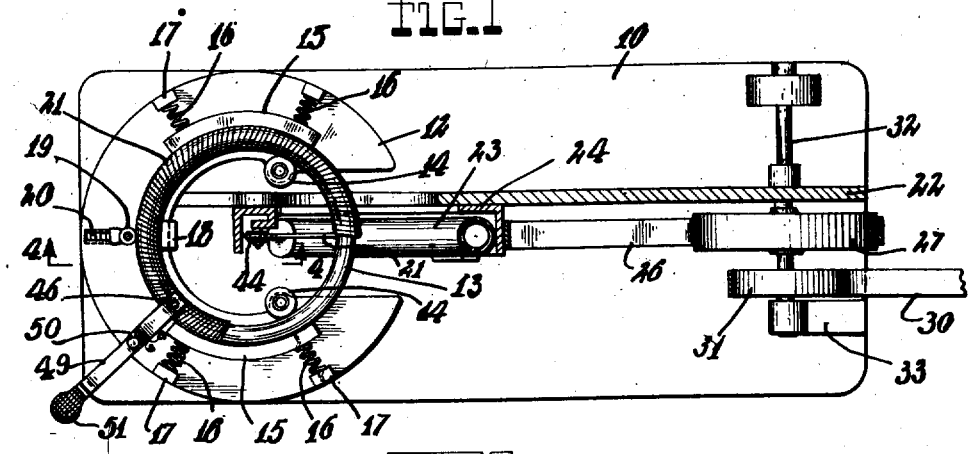
Fig. 2 is a top plan view thereof, showing certain parts in section.
Figure 3:
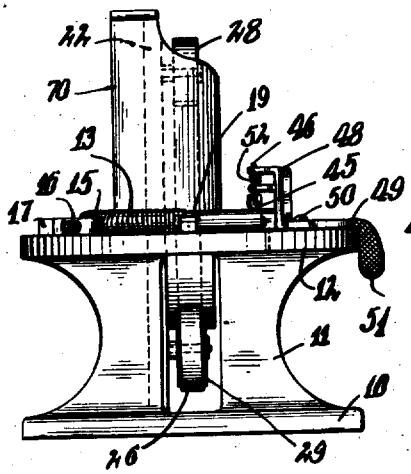
Fig. 3 is a side elevational view thereof.
Figure 4:
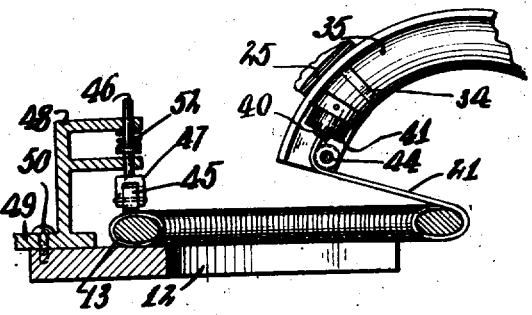
Fig. 4 is an enlarged fragmentary detail view thereof.
Figure 5:
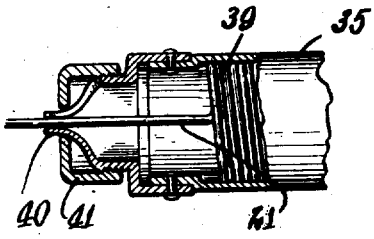
Fig. 5 is a similar view thereof.

As here embodied my improved device comprises a base 10 having a standard 11 to accommodate a horizontal table 12, as a means of holding the wreath core 13, of tubular circular construction, in two longitudinal sections, and which is slidably held thereon by means of the rollers 14, at its inner periphery, and the blocks 15, curved to fit the outer periphery of the wreath core 13, and held in contact thereto by means of springs 16, super-imposed between the said blocks 15 and protruding portions 17 of the table 12, and a support 18 with a roller 19 forced against the outer periphery of the wreath core 13 by a spring 20, to hold the wrapping 21, preferably Japanese roping, cord, string, paper or the like in place.

The base 10 is also provided with an upright portion 22 to support the wrapping container 23, which is removably attached to a circular flanged element 24 by spring clips 34 rotatively attached to the upright portion 22 by a plurality of clamping members 25.

As a means of rotating the wrapping container 23, I have provided a belt 26 extending over a pulley 27, and over the pulleys 28 and 29, located adjacent to the circular flanged element 24, over which the belt 26 is also extended and may be held tight by an idler roller 26′, as clearly shown in Fig. 1 of the accompanying drawing.

The belt 26 is driven by the main belt 30 which is extended over the pulley 31 attached to a shaft 32, to which the pulley 27 is also attached, the shaft 32 being rotatively mounted in suitable bearings supported as at 33 from the base 10.

The wrapping container 23 is of flexible tubular construction, bent or formed circular, and having two extremities 35 and 36, the extremity 35 is provided with a cap 37 attached thereto by means of bayonet locking devices engaging in the bayonet slots 38, or any suitable attaching means may be employed. The wrapping 21 is forced into the wrapping container 23, as designated by the numeral 39, and has one end extended through an axial aperture in the cap 37. As a means of regulating the feed of the wrapping 21, I have provided extended portions 40, which may be pressed against the wrapping 21, by screwing the cover 41 on the cap 37, it being understood that the extended portions will be sprung when the cover 41 is screwed down.

It will be understood that the wrapping 21 is fed or pulled through the said axial aperture in the cap 37, when the wrapping container is rotated, as hereinbefore described, and that the wrapping 21 is extended over the flanged wheel 44, the wrapping 21 is thus twisted around the wreath core 13, the said wreath core being slid or rotated on the horizontal table 12.

As a means of holding the wreath core 13 stationary, I have provided a roller 45 rotatively attached to a stem 46, as at 47, the stem 47 being a slidable fit in the protruding portions 48 of the lever 49, which is pivoted to the table 12, as at 50, the lever 49 having a depending handle 51, to swing or pivot the roller 45, which is pressed downward by the spring 52 super-imposed between the protruding portions 48 of the lever 49. A suitable protecting plate 70 is hingedly fixed at the end of upright portion 22 which is lowered when the machine is in operation.

Figure 8:
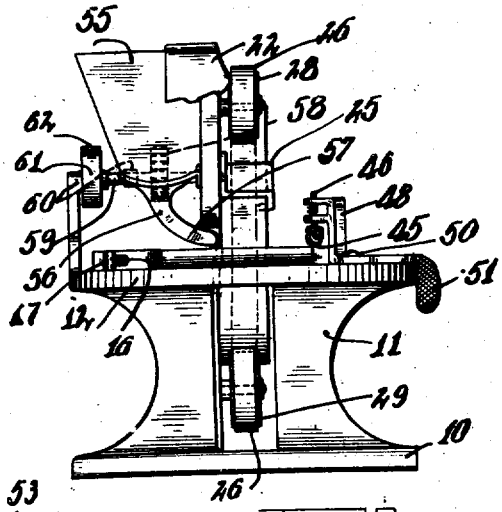
Fig. 8 is a side elevational view thereof.
Figure 7:
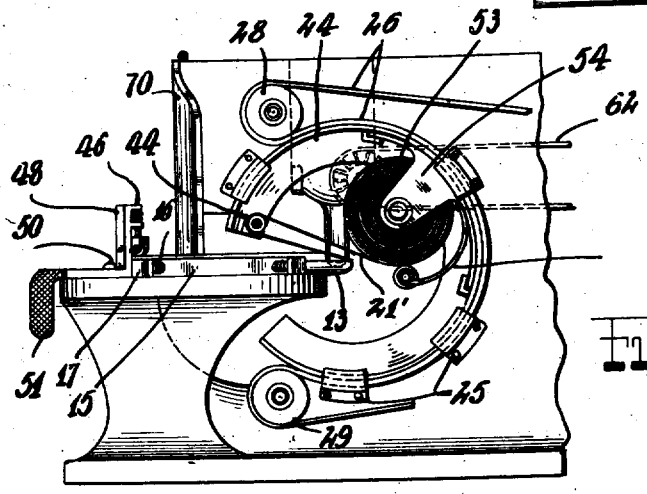
Fig. 7 is a fragmentary front elevational view showing a modification of my improved device.
Figure 6:
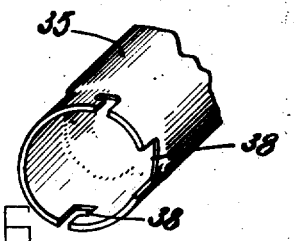
Fig. 6 is an enlarged fragmentary perspective detail view thereof.

I now refer in particular to Figs. 7 and 8 of the accompanying drawings, in which I have shown a modification of my improved device. The wrapping 21′ preferably strip paper, or the like, is wound in a roll 53, which is rotatively attached to the upright portion 22, by an arm 54. The wrapping 21 is extended over a flanged wheel 44, and then wound around the wreath core 13, the flanged wheel 44 being attached to the flanged element 24, which is rotated by the belt 26. I have also provided a means of placing moss, or the like, on the upper side of the wreath core 13, prior to wrapping the said wreath core, which comprises a hopper 55, or container, in which the moss is placed, having an outlet orifice 56 provided with an opening 57 directly above the wreath core 13. I have also provided a vane wheel 58, located in the bottom of the hopper 55, attached to a shaft 59 rotatively mounted on bearings 60, and a pulley 61 attached to the shaft 59, over which a belt 62 is extended to rotate the vane wheel 58, in order to force the moss in the hopper 55 through the outlet orifice 56.

It will be understood that wreaths of this character have heretofore been made by hand, the shell or body being pressed in two semi-circular cross-sections and then manually covered with the covering material. This invention not only includes a new method of manufacturing such wreaths by permitting each shell to be inserted into an automatic device which, being operated by power, will then rapidly cover the shell to form the wreath, but also provides a new method of forming a wreath of the type having a solid body of moss-like material, after which a covering is applied in the same way, this covering being either a flat strip of paper, the strip of Japanese covering, or both. Wreaths of this latter character, containing moss, have heretofore had to be formed by hand around a wire frame; but with this new method of extruding the moss under considerable compression, the material retains its shape while the machine automatically covers it to make this shape permanent. Moreover, with the invention here disclosed, either type of wreath may be made on the one machine at will, and with but minor adjustments which can be rapidly made.

The invention also discloses new forms of wreaths as new articles of manufacture.

Finally, the idea of rotating one annular object within another, the former of which contains material to be fed around the other, is an invention of considerable importance in various industries outside of the particular one here disclosed.

While I have above described the preferred form, construction and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:—

1. In a device of the class described having a support for a wreath core, a base having a standard to accommodate a table, rollers, and blocks held in contact with said wreath core by springs, said base being provided with an upright portion to support a wrapping container removably attached to a flanged element by spring clips, said wrapping container being rotatively attached to the said upright portion by a plurality of clamping members, a belt extended over a pulley, and over pulleys located adjacent to the said flanged element, said belt abutting said wrapping container as a means of rotating the said wrapping container.

2. In a device of the class described, a wrapping container of flexible tubular construction, formed circular and having two extremities, one of the said extremities being provided with a cap attached thereto by means of a bayonet locking device engaging in bayonet slots, an axial aperture in the said cap, a spring, and an adjusting screw threadedly attached to the said cap and having a knob by means of which the extremity of the said spring may be forced or released.

3. In a device of the class described a means of holding a wreath core stationary on a table, comprising a roller rotatively attached to a stem, said stem being a slidable fit in protruding portions of a lever pivoted to the said table, said lever having a depending handle, said roller being pressed downward by a spring superimposed between the said protruding portions of the said lever.

4. In a device of the class described, a hopper having an outlet orifice provided with an opening directly over a wreath core, a vane wheel located in the bottom of the said hopper attached to a shaft rotatively mounted in bearings, a pulley attached to the said shaft, and a belt extended over the said pulley to rotate the said vane wheel.

5. In a device of the class described having a support for a wreath core, and a wrapping container, the combination of a base, a standard depending from said base, a table supported by said standard, rollers projecting from said table, and adapted to abut the inner side of said wreath core, blocks with attached springs associated with said table, adapted to abut the outer side of said wreath core, an upright portion projecting from said base, a flange element and spring clips depending from said upright portion, to removably support said wrapping container, a clamping member also depending from said upright portion, rotatively supporting said wrapping container, another standard depending from said base, a pulley rotatably supported by said last mentioned standard, other pulleys located adjacent to said flange element, and supported in said upright portion, and a belt extended over said pulleys, said belt being abutable against said wrapping container as a means for rotating the wrapping container.

Signed at New York, in the county of New York and State of New York, this 25th day of June, 1927.

GEORGE PULLETS.